United States Patent
Buckley

(12) 
(10) Patent No.: US 6,366,840 B1
(45) Date of Patent: *Apr. 2, 2002

(54) VEHICLE INSTRUMENT PANEL WIRELESS COMMUNICATION

(75) Inventor: Stephen J Buckley, Novi, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/574,646

(22) Filed: May 18, 2000

Related U.S. Application Data

(63) Continuation-in-part of application No. 09/221,504, filed on Dec. 28, 1998, now Pat. No. 6,246,935, which is a continuation-in-part of application No. 08/980,641, filed on Dec. 1, 1997, now Pat. No. 6,032,089.

(51) Int. Cl.[7] .................................................. G06F 7/00
(52) U.S. Cl. ...................................... 701/36; 340/425.5
(58) Field of Search .................... 701/36, 1; 340/425.5, 340/438; 307/10.1

(56) References Cited

U.S. PATENT DOCUMENTS 5,859,628 A * 1/1999 Ross et al. ................... 345/173
6,028,764 A * 2/2000 Richardson et al. ......... 361/681
6,032,089 A * 2/2000 Buckley ....................... 701/36
6,246,935 B1 * 6/2001 Buckley ....................... 701/36

OTHER PUBLICATIONS

S. J. Buckley et al., *The Car as a Peripheral, Adapting A Portable Computer To A Vehicle Intranet*, 6 pages, Copyright 1997 Society of Automotive Engineers, Inc.

* cited by examiner

*Primary Examiner*—William A. Cuchlinski, Jr.
*Assistant Examiner*—Marthe Marc-Coleman
(74) *Attorney, Agent, or Firm*—Mark P. Calcaterra

(57) ABSTRACT

A system for enabling wireless communication among a removable stand-alone computer, a built-in vehicular display, and an electrical system of a vehicle. A wireless communications medium couples a third wireless communication interface to a second wireless communication interface, the first wireless communication interface to a third wireless communication interface, and a second wireless communication interface to the third wireless communication interface. The removable stand-alone computer incorporates trip computer functions via the wireless communications medium.

3 Claims, 1 Drawing Sheet

VEHICLE INSTRUMENT PANEL WIRELESS COMMUNICATION

RELATED APPLICATION

This is a continuation-in-part of U.S. application Ser. No. 09/221,504 filed Dec. 28, 1998 now U.S. Pat. No. 6,246,935 which is a continuation-in-part of Ser. No. 08/980,641 filed Dec. 1, 1997 now U.S. Pat. No. 6,032,089.

The disclosures of Ser. Nos. 08/980,641 and 09/221,504 are hereby incorporated by reference.

BACKGROUND OF THE INVENTION

FIELD OF THE INVENTION

The invention relates generally to computer interfacing and message exchange between communication nodes. More specifically, the invention pertains to a system for enabling wireless communication among a removable stand-alone computer, a built-in vehicular display, and an electrical system of a vehicle. The system includes a wireless communications medium which links the removable stand-alone computer to the various functional electrical systems of the vehicle. In addition, trip computer functions are incorporated on the stand-alone computer via the wireless communications medium. Ser. No. 08/980,641 specifically pertains to a communications system including a miniaturized palm top computer which is coupled to a programmable node positioned in an instrument panel of a vehicle. Additionally, Ser. No. 09/221,504 pertains to a communications system including a stand-alone computer coupled to an interface for a computer system of a vehicle. The invention detailed in the above-referenced parent applications are directly interfaced with the present invention forming a cohesive operative network of linked vehicular electrical systems.

Automotive manufacturers and computer companies have discussed the feasibility of in-vehicle computers. However, these contracts have centered about a permanently installed computer in the vehicle. With the rapid evolution of computer technology, a permanently installed computer of a given type would quickly become obsolete as advancements in the computer art surge onward. Therefore, there is a need for a cost effective approach to link rapidly evolving stand-alone computers to vehicular communication systems such as the present invention.

SUMMARY OF THE INVENTION

A wireless communications medium provides communication between a stand-alone removable computer and an electrical system of a vehicle. The communications medium includes an interface operative to exchange information between electrical systems on the vehicle and the removable computer. The removable stand-alone computer may now incorporate trip computer functions via the wireless communications medium. The removable computer is linked to a driver information display mounted in the instrument panel of the vehicle via the wireless communications medium.

BRIEF DESCRIPTION OF THE DRAWINGS

The objects and features of the invention will become apparent from a reading of the detailed description, taken in conjunction with the drawings in which.

DETAILED DESCRIPTION

Figure 1:
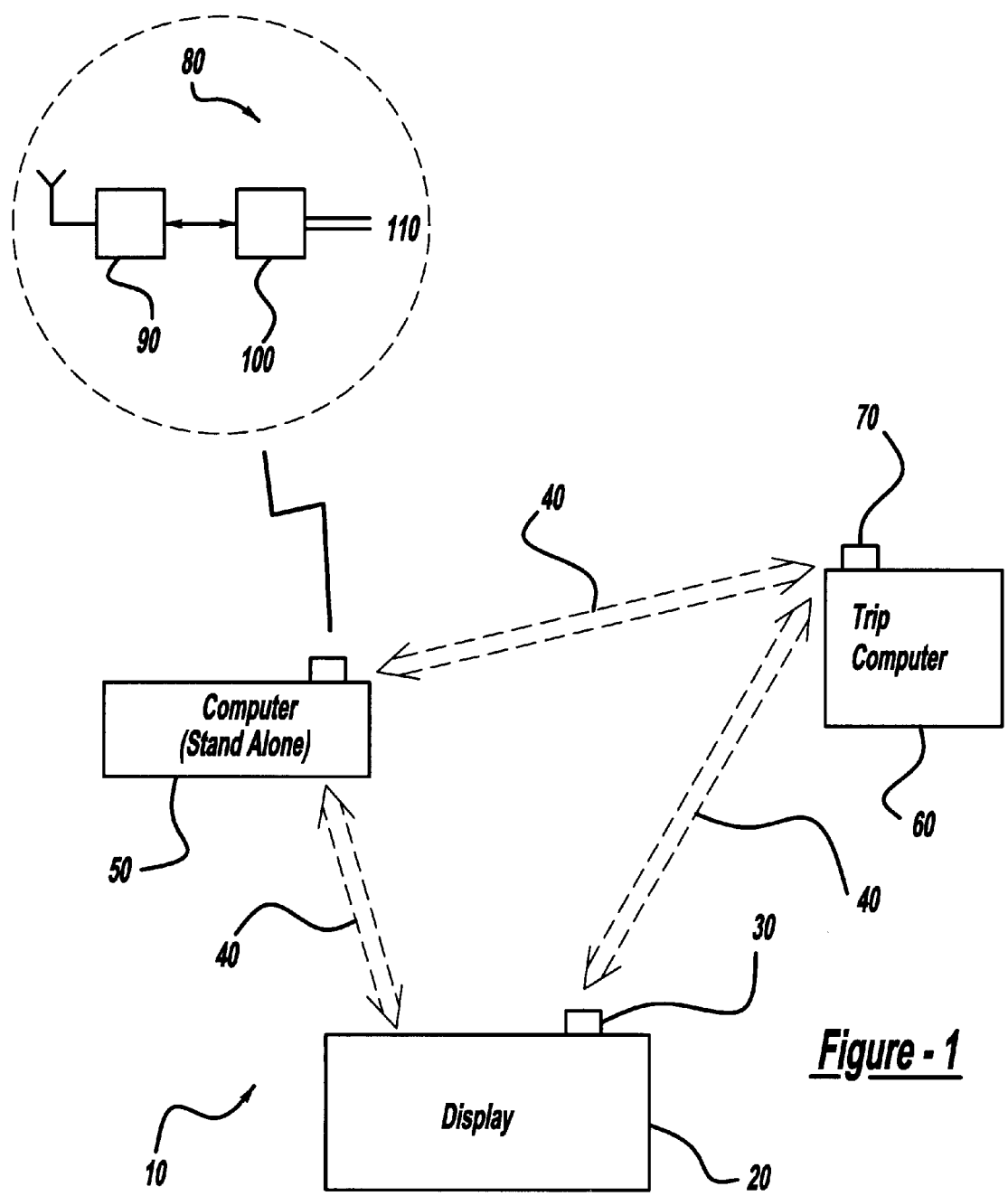
FIG. 1 is a block diagram of a vehicle instrument panel wireless communication system arranged in accordance with the principles of the invention.

A vehicle arranged with the contemplated system 10 contains a sophisticated digital network to link both vehicle and external information sources. In one embodiment, a removable stand-alone computer 50 is linked to an electrical system 110 of a vehicle such as a trip computer via a wireless communications medium 40. The wireless communications medium 40 couples a first wireless communication interface 80 positioned at the stand-alone computer 50 to a second wireless interface 70 positioned at a predetermined location for the trip computer 60. The communications medium 40 couples a third wireless communication interface 30 positioned at a built-in vehicular display 20 to afford a visual readout. Wireless communication is now available between the removable stand-alone computer 50, the built-in vehicular display 20, and the vehicular trip computer 60 facilitating a network of wireless communications. A commercially available embodiment of a wireless communications medium 40 is the Bluetooth technology currently in use by Nokia, and Motorola. The technology is an open specification for wireless communication of data and voice. It is based on a short-range radio link, built into a 9×9 mm microchip facilitating protected ad hoc connections for stationary and mobile communication environments. A Bluetooth baseband controller 100 provides the "interface between the Bluetooth radio 90 and the stand-alone computer 50. Bluetooth technology allows for the replacement of cables that connect one device to another with one universal short-range radio link. A collection of devices connected via Bluetooth technology starts with two forming a piconet. All Bluetooth devices are peer units and have identical implementations. However, when establishing a piconet, one unit will act as a master and the other(s) as slave(s) for the duration of the piconet connection. Designed to operate in a noisy radio frequency environment, the Bluetooth radio uses a fast acknowledgment and frequency hopping scheme to make the link. Bluetooth radio modules avoid interference from other signals by hopping to a new frequency after transmitting or receiving a signal. Compared with other systems operating in the same frequency band, the Bluetooth radio 90 hops faster and uses shorter signals. Bluetooth radios 90 operate in the unlicensed ISM band at 2.4 GHz. Hence, the removable stand-alone computer 50 may incorporate trip computer functions via the Bluetooth system.

The invention has been described with reference to an exemplary embodiment. This description is for the sake of example only, and the scope and spirit of the invention ought to be construed by appropriate interpretation of the appended claims.

What is claimed is:

1. A system for enabling wireless communication among a removable stand-alone computer, a built-in vehicular display, and an electrical system of a vehicle, the system comprising:

a first wireless communication interface positioned at the stand-alone computer;

a second wireless communication interface positioned at a predetermined location for the electrical system of the vehicle;

a third wireless communication interface positioned at the built-in vehicular display; and a wireless communications medium coupling the first, second and third wireless communication interfaces to each other.

2. The system of claim 1 wherein the wireless communications medium includes Bluetooth technology to perform the communication link interfaces.

3. The system of claim 1 wherein the removable stand-alone computer incorporates trip computer functions via the wireless communications medium.

* * * * *